United States Patent [19]

Smay

[11] Patent Number: 5,611,505
[45] Date of Patent: Mar. 18, 1997

[54] SPACECRAFT ENERGY STORAGE, ATTITUDE STEERING AND MOMENTUM MANAGEMENT SYSTEM

[75] Inventor: John W. Smay, Redondo Beach, Calif.

[73] Assignee: Hughes Electronics, Los Angeles, Calif.

[21] Appl. No.: 342,061

[22] Filed: Nov. 18, 1994

[51] Int. Cl.$^6$ .................................................. B64G 1/28
[52] U.S. Cl. .................................................. 244/165
[58] Field of Search .................................. 244/164, 165, 244/3.1; 290/1 R

[56] References Cited

U.S. PATENT DOCUMENTS

| | | | |
|---|---|---|---|
| 3,329,375 | 7/1967 | Kurzhals et al. | 244/165 |
| 3,424,401 | 1/1969 | Maure | 244/165 |
| 3,452,948 | 7/1969 | Kukel et al. | 244/165 |
| 3,526,795 | 9/1970 | Pecs . | |
| 4,230,294 | 10/1980 | Pistiner . | |
| 4,662,178 | 5/1987 | Rasmusson . | |
| 4,723,735 | 2/1988 | Eisenhaure et al. . | |
| 4,732,353 | 3/1988 | Studer | 244/165 |
| 5,112,012 | 5/1992 | Yuan et al. | 244/165 |
| 5,205,518 | 4/1993 | Stetson, Jr. | 244/165 |
| 5,261,631 | 11/1993 | Bender et al. | 244/165 |
| 5,269,483 | 12/1993 | Flameul | 244/165 |
| 5,315,158 | 5/1994 | Danielson | 244/165 |

FOREIGN PATENT DOCUMENTS

| | | |
|---|---|---|
| 2347716 | 11/1977 | France . |
| 0520165 | 12/1992 | France . |

*Primary Examiner*—Galen L. Barefoot
*Attorney, Agent, or Firm*—Terje Gudmestad; Wanda K. Denson-Low

[57] ABSTRACT

A system for providing energy storage, attitude steering, and momentum management of a spacecraft is shown using a pair of gimbaled flywheels. Two flywheels are positioned with spin axes nominally co-aligned along the spacecraft pitch axis and are spun in opposite or the same direction at differential or equal speeds to store spacecraft momentum as desired. Angular momentum can be tilted from the normal alignment with respect to the spacecraft body. This system will reduce the weight of conventional spacecraft and also reduce the cost.

13 Claims, 5 Drawing Sheets

SPACECRAFT ENERGY STORAGE, ATTITUDE STEERING AND MOMENTUM MANAGEMENT SYSTEM

TECHNICAL FIELD

This invention relates to energy storage, attitude steering and momentum management for a spacecraft.

BACKGROUND ART

Management of momentum and attitude steering utilizing flywheels in spacecraft is known today. Such spacecraft often employ momentum bias and wheel gimbaling to accomplish momentum management and attitude steering.

Energy storage utilizing electrochemical battery technology is also well established in the art. Although alternative energy storage strategies, such as those employing flywheels, have been explored, the achievable energy densities did not surpass the energy densities of electrochemical batteries.

The recent development of suitable materials has enabled improvements in achievable energy densities of flywheel systems by permitting higher rotational speeds. Current flywheel systems may have rotational speeds exceeding 100,000 RPM. These operating speeds require a non-contacting bearing system, such as a magnetic suspension system, to overcome frictional losses and mechanical wear. As is known in the art, successful magnetic suspension systems require sophisticated control strategies and equipment to mollify the effects of disturbances to the system. Recent advancements in microprocessor operating speeds have enabled control of magnetic suspension systems which can successfully accommodate the higher operating speeds necessary for these applications. Thus, energy storage in spacecraft utilizing flywheels is now feasible.

Unlike electrochemical energy storage systems, energy storage and retrieval utilizing a flywheel system affects the attitude steering and momentum control of the spacecraft. Therefore, it is desirable to integrate the control of attitude steering and momentum management with the control of energy storage in the flywheel system of the spacecraft.

A combined energy storage attitude control, and attitude reference system is disclosed in U.S. Pat. No. 4,723,735 to Eisenhaure et al. The system disclosed by Eisenhaure utilizes counter-rotating flywheels for attitude steering and energy storage in a zero-momentum spacecraft. That design would not be appropriate for use with momentum-bias spacecraft, however. Furthermore, the momentum change and associated torques available for attitude steering, utilizing counter-rotating flywheels, is approximately one-half that available for similarly sized flywheels which rotate in the same direction.

SUMMARY OF THE INVENTION

The present invention affords a system for synergistically providing energy storage, attitude steering and momentum management for a spacecraft. This is accomplished by using a pair of gimbaled flywheels. Two flywheels are positioned with their spin axes nominally co-aligned along a spacecraft axis, such as the pitch, roll, or yaw axis, and are spun in the opposite or the same direction at differential or equal speeds to store spacecraft momentum as desired for the particular application or mission phase. Each wheel is gimbaled about two axes orthogonal to its spin axis, or mounted on a two-degree-of-freedom flexible pivot, allowing its angular momentum to be tilted from the nominal alignment with respect to the spacecraft body. The mechanical advantage obtained utilizing a jackscrew and stepper motor arrangement to tilt the angular momentum allows use of a smaller motor to provide the same momentum as previous double-gimbaled control moment gyroscopes (CMG).

The present invention will facilitate the use of identical spacecraft hardware components for fundamentally different attitude control concepts, such as momentum-bias and zero-momentum over a wide variety of geosynchronous, and low altitude elliptical orbits using complex steering laws such as sun-nadir steering. The present invention will also allow the same spacecraft energy storage and attitude control design to perform a wide variety of missions from geosynchronous communications or weather observation, to low altitude Earth resource observation.

The present invention will reduce the weight of a spacecraft when compared with current technology electrochemical energy storage and standard momentum or reaction wheel steering implementations. Also, the invention will reduce costs by allowing the use of identical hardware design and components over a range of missions, whereas current technology employs different designs for different missions.

The various features, objects, benefits and advantages of the present invention will become more apparent upon reading the following detailed description of the preferred embodiments, along with the appended claims in connection with the accompanying drawings.

DESCRIPTION OF THE PREFERRED EMBODIMENT

Figure 1:
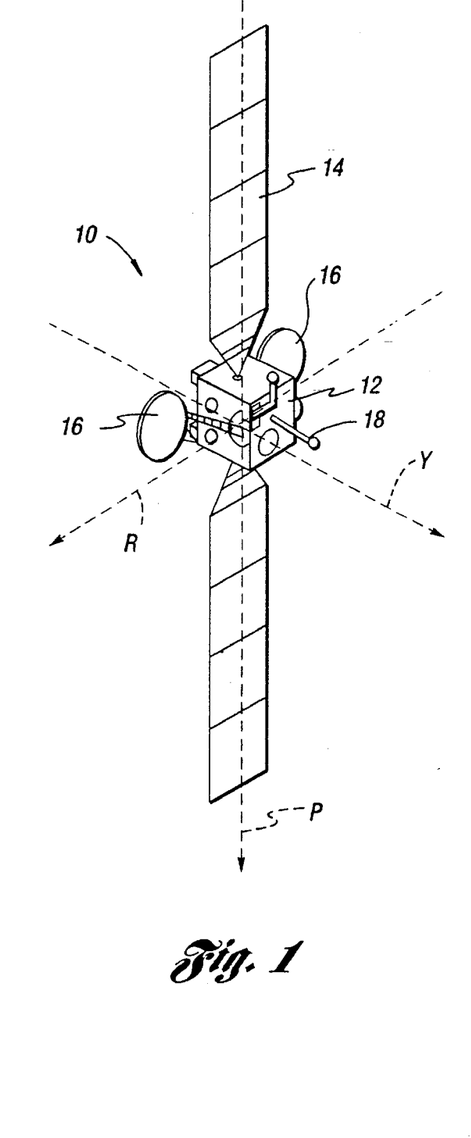
FIG. 1 shows a three-axis stabilized satellite to illustrate the improved system in accordance with the present invention.

FIG. 1 illustrates a conventional three-axis stabilized satellite or spacecraft 10, preferably situated in a stationary orbit about the Earth. The satellite 10 has a main body 12, a pair of solar panels 14, a pair of antennas 16, and an Earth antenna 18 which is aimed at a control ground station.

The three axes of the spacecraft 10 are shown in FIG. 1. The pitch axis P is substantially vertical and lies along the plane of the solar panels 14. The roll axis R and yaw axis Y are perpendicular to the pitch axis P and lie in the directions and planes shown. The antenna 18 points to the Earth along the yaw axis Y.

Figure 2:
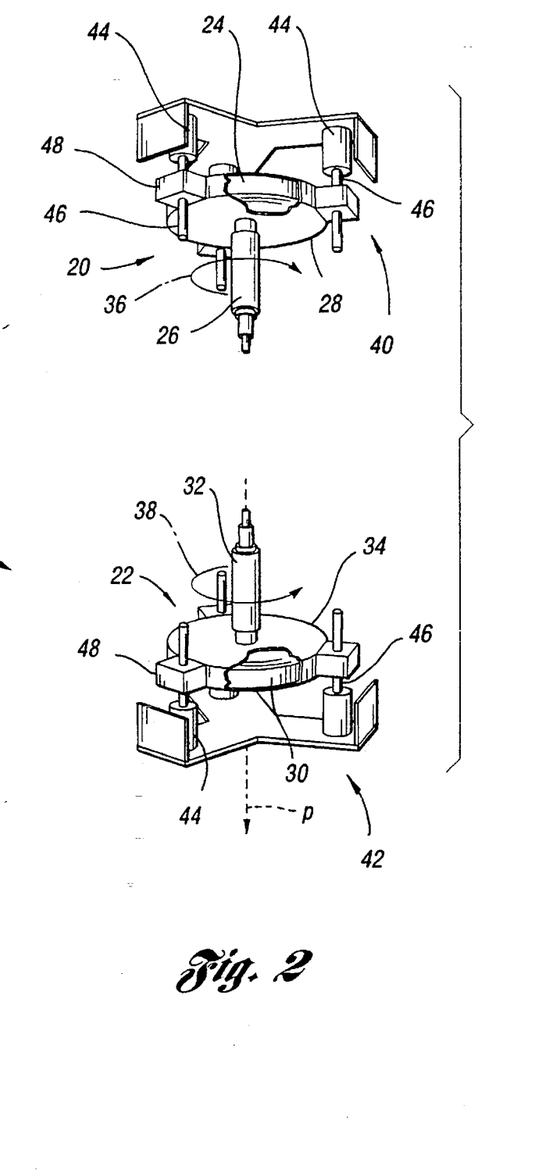
FIG. 2 illustrates a schematic view of a pair of gimbaled flywheels in accordance with the present invention.

The momentum for the spacecraft 10 is achieved by a pair of gimbaled momentum members 20 and 22. These are shown in FIG. 2. The momentum members 20 and 22 are disposed within the body 12 of the spacecraft 10 and are positioned with their spin axes co-aligned along the spacecraft pitch axis P.

The momentum member 20 includes a momentum flywheel 24 which is mounted on a shaft 26 within housing 28. Similarly, momentum member 22 includes a momentum wheel 30 mounted on a shaft 32 within housing 34. The momentum wheels 24 and 32 are magnetically suspended and rotated about the axis of the shafts 26 and 32 as indicated by curved arrows 36 and 38.

The two flywheels 24 and 30 are spun in the opposite or the same direction at differential or equal speeds to store spacecraft momentum as desired for the particular application or mission phase. Each wheel 24 and 30 is gimbaled about two axes orthogonal to its spin axis, as known in the art, or mounted on a two-degree-of-freedom flexible pivot arrangement 40,42. Each pivot arrangement 40,42 includes a plurality of stepper motors 44 and associated jackscrews 46. The housings 28,34 include a plurality of flanges 48 each having a threaded hole for engagement with an associated jackscrew 46. This arrangement allows the angular momentum of the wheel to be tilted from the nominal alignment with respect to the spacecraft body. Furthermore, the mechanical advantage provided by the jackscrew facilitates the use of smaller drive motors than those utilized for traditional dual gimbaled mounts.

Although each flywheel 24,30 is fully operational utilizing only two (2) flexible pivot arrangements 40,42, each preferably includes three (3) such arrangements to provide redundancy should any one of the three become inoperative.

In general, the energy storage function of spacecraft is accomplished today by collecting solar energy using solar panels, and storing the energy in electrochemical batteries when the spacecraft is in the sun light. The stored energy is then available to the spacecraft during eclipses. In the present invention, however, energy storage is provided by spinning both flywheels 24 and 30 at a high rate of speed, on the order of 50,000 to 100,000 rpm, or more, when storing energy. The rotational speeds may then be drawn down to a rate on the order of 15,000 to 30,000 rpm when energy is consumed.

In order to allow the wheels to spin at the rates indicated, the wheels preferably are made of high strength composite material such as carbon fiber. This material will support energy densities of 50 to 100 watt-hours/kg which is an improvement over electrochemical batteries which yield about 10 to 25 watt-hours/kg. The stronger materials allow the wheels to spin much faster by maintaining structural integrity while being subjected to significant centrifugal forces. In order to support the flywheels at high rates of speed, magnetic suspension bearings are utilized.

In the present invention, the energy storage function is performed by varying the wheel speed between low and high limits when the wheels are "discharged" or "charged". For illustrative purposes, consider a typical spacecraft requiring 4 kwh of energy storage in two wheels having inertia $I_w=0.4$ slug-ft$^2$. The requisite 2 kwh=5.32×10$^6$ ft-lb of energy per wheel can be stored changing wheel speed from v=15,000 to 52,000 rpm. If the 2 kwh of energy must be withdrawn over about one hour (the duration of a nominal geosynchronous orbit eclipse), the power is 2 kw=1476 ft-lb/sec =vT, requiring maximum torque T of about 1 ft-lb at minimum speed.

The two-flywheel arrangement in the present invention can be used for three-axis attitude steering of the spacecraft. Spacecraft attitude steering torques are provided by commanding differential acceleration about the spin axis (pitch axis P) and by torquing the transverse gimbal axes (roll axis R/yaw axis Y). The attitude sensing is provided by a conventional complement of spacecraft attitude sensors, such as gyros, and/or Earth, sun, or star sensors. For pitch steering, the flywheel motors apply torque to the wheel and react on the spacecraft to provide pitch steering torque. This will necessarily interact with the energy storage function by adding or removing energy in the flywheel.

In some applications it may be preferable to align the wheel spin axes with the spacecraft roll, yaw, or an arbitrary axis, such orientation is acceptable and the functional operation is substantially the same with respect to the new coordinate system.

The 1 ft-lb of torque (T) discussed above for energy extraction at minimum speed is adequate for typical non-agile spacecraft steering. To implement roll-yaw attitude steering, one or both wheels 24,30 are tilted about their transverse axis gimbals. This rotates the spin momentum vectors in the body and thus, by observing conservation of angular momentum, imparts momentum to the spacecraft body.

When there is no momentum bias, steering may be effected by gimbaling one wheel, or twice the authority may be obtained by gimbaling two wheels in opposite directions. When there is a momentum bias, the wheels may be gimbaled as a locked pair for fine resolution torquing, gimbaled singly for more torque authority, or gimbaled in opposite directions for maximum torque authority.

The attitude steering can be illustrated by the following example. Let the spacecraft with momentum bias ΔH=50 ft-lb-sec from above, have roll and yaw moments of inertia $I_{11}=I_{33}=4000$ slug/ft$^2$. Further, with the wheels in their low energy state, they will have respective angular momentum $H_1=550$ ft-lb-sec and $H_2=600$ ft-lb-sec. If the wheels are gimbaled about the yaw axis Y by the angle 0.01°, this will induce spacecraft roll rates of 0.0072, 0,086, and 0.17 deg/sec, respectively, when gimbaled as a pair, singly, and differentially.

The momentum management of the spacecraft is primarily the storage of momentum accumulated through environmental disturbance torques. This can be achieved in the present invention by adjusting the differential speed of the wheels about their spin axis and by appropriately tilting one, or both, about the transverse axis. Very large changes in momentum can be effected by spinning both wheels in the same direction.

In the present invention, the two energy storage flywheels 24 and 30 with the spin axis nominally parallel to the spacecraft pitch axis P are allowed to have spin motion in either direction and at independently controlled rates. A third wheel (not shown) may exist in standby redundancy to achieve required spacecraft reliability if necessary, but this is not a required part of the present invention. As shown in FIG. 1, each of the two flywheels 24 and 30 is separately gimbaled about the two transverse axes, namely roll axis R and yaw axis Y, as depicted.

The flywheels 24,30 are supported in a vacuum and spun on non-contacting magnetic bearings as described above. This is necessary to support the high speeds necessary for suitable energy density with low parasitic losses due to friction, windage, eddy and the like. High strength composite currents, materials are necessary for the flywheel rotor to provide structural integrity at the high spin speeds. A motor-generator operated over the wide spin speed range with low losses is also preferred to inject and withdraw energy from the wheels.

The present invention will reduce the weight of a satellite when compared to current technology electrochemical energy storage and standard momentum or reaction wheel steering implementations. For example, the weight of a 6 kw spacecraft could be reduced through use of the present invention by 300 to 600 lbs, depending on the particular orbit application. The present invention also will significantly reduce the cost of spacecraft by allowing the use of identical hardware design and components over a range of missions for which present technology employs unique designs for various missions.

The momentum management of the present invention can be described with the following example. If a momentum bias is required for spacecraft attitude stabilization, then a constant wheel speed differential $\Delta v=v_2-v_1$ is maintained to establish angular momentum $\Delta H=\Delta v J_w$. A typical momentum bias is 50 ft-lb-sec, which in the example indicated above, would require a wheel rate differential of 1200 rpm. With use of the present invention, it is possible to obtain a momentum bias from zero to several times 50 ft-lb-sec.

For storage of pitch angular momentum accumulation due to environmental torques, typically 1 to 10 ft-lb/sec, the differential speed is adjusted slightly. Accumulated roll/yaw angular momentum in axes orthogonal to the wheel nominal spin axis (pitch axis P), is stored by tilting the wheel a small amount in the spacecraft body 12. Continuing with the same example, at low speed, a single wheel has a momentum of about 600 ft-lb-sec, so a tilt of 1° would suffice to store the large transverse momentum. It should be noted in this regard, that in the transverse axis, the tilt should vary with the state of "charge" of the wheels to store a relatively constant transverse momentum.

In the present invention, the interaction between power control and attitude steering is important. In order to maintain the spacecraft in a fixed attitude, the wheel cant geometry and differential momentum magnitude must have the same magnitude and direction to equal some current stored momentum. This can be explained as follows. Over some short term, for example minutes, there is a constant power draw or charge rate. To produce this power, wheel speed must be changed in a non-linear manner, while the differential momentum must remain fixed and the transverse momentum must remain fixed as well to maintain pointing. This is despite possible changes in the absolute momentum of the wheel producing the power, In the latter event, the wheel cant should be changing systematically with energy drain. In the short term, wheel cant and differential speed will be controlled by the spacecraft pointing sensors and pointing control law. Simultaneously, the two wheel speeds will be gradually increasing or decreasing. A separate energy reservoir, for example, a capacitor or small chemical battery could be used to absorb high speed spacecraft power bus transients so that these do not perturb spacecraft attitude pointing. However, this is not required to achieve pointing accuracies well in excess of those required for typical communication satellites.

Figure 3:
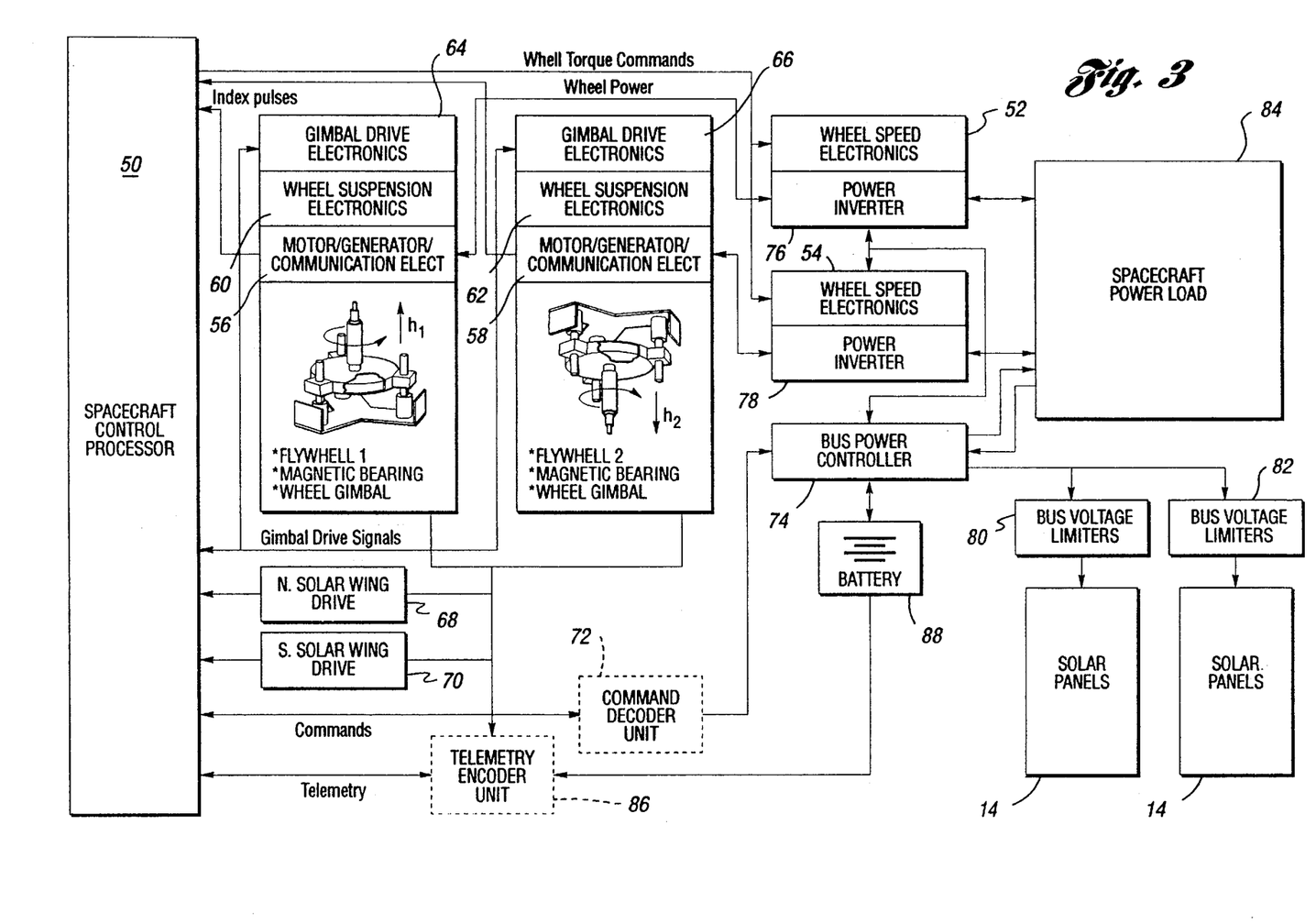
FIG. 3 illustrates the functional integration of attitude steering, momentum management, power control, and energy storage blocks in a spacecraft subsystem in accordance with the present invention.

Referring now to FIG. 3, a block diagram of the system which provides spacecraft attitude steering, momentum management, power control, and energy storage in accordance with the present invention is shown. A spacecraft control processor (SCP) 50 performs a number of functions which may include post ejection sequencing, transfer orbit processing, acquisition control, stationkeeping control, normal mode control, mechanisms control, fault protection, and spacecraft systems support, among others. SCP 50 generates wheel torque commands which are communicated to wheel speed electronics 52 and 54 to effect changes in wheel speed for either wheel 34 or wheel 38, respectively. SCP 50 receives index pulses from motor/generator (MG) commutation electronics 56 and MG 58 which indicate wheel speed and direction of rotation corresponding to wheels 34 and 38.

As also shown in FIG. 3, each wheel 34 and 38 has corresponding magnetic suspension electronics 60 and 62 to maintain proper operation of the magnetic support bearings. Gimbal drive electronics 64 and 66 are also in communication with SCP 50 for receiving drive signals and generating feedback signals for adjusting the orientation of the angular momentum vector of wheels 34 and 38. SCP 50 communicates with solar wing drives 68 and 70 for appropriate positioning of solar panels 14 so as to properly manage energy storage and retrieval.

Still referring to FIG. 3, a command decoder unit communicates with SCP 50 to decode commands bound for bus power controller 74. Power inverters 76 and 78 are connected to MG electronics 56 and 58, respectively, and also connected to bus power controller 74. Bus voltage limiters 80 and 82 are connected to solar panels 14, bus power controller 74, and a power bus represented by spacecraft power load 84. The system of FIG. 3 also includes a telemetry encoder unit 86 and an electrochemical battery 88. SCP 50 also communicates with telemetry encoder unit 86, which receives signals from various spacecraft components and subsystems indicating current operating conditions and relays them to a ground station.

Figure 4:
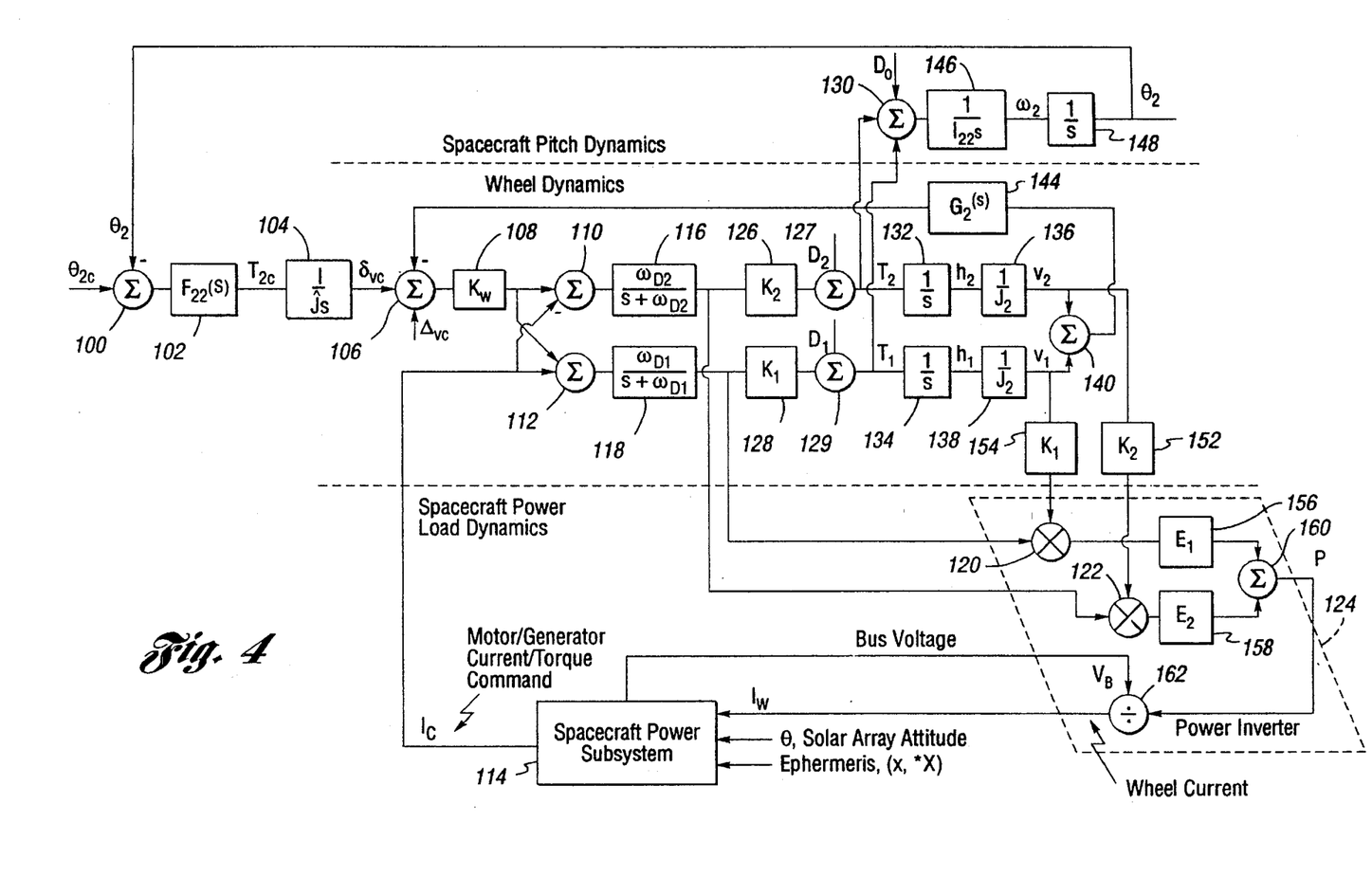
FIG. 4 illustrates spacecraft pitch dynamics, wheel dynamics, and power load dynamics for the spacecraft system illustrated in FIG. 3.

An illustration of the interaction between spacecraft pitch dynamics, wheel dynamics and power load dynamics is provided by FIG. 4. Flywheel MG currents combine to deliver power to, or draw power from, the spacecraft power bus and the resultant torques combine and react on the spacecraft body, nominally as a pitch torque. As the wheels are gimbaled for roll and yaw control, a minor coupling of spin torques is shown elsewhere to act on the transverse axes (roll and yaw), as described in greater detail below.

In the system of the present invention, illustrated in FIGS. 3 through 7, power demands apply equal and opposite wheel torques through wheel speed electronics 52 and 54 and motors 56 and 58 which nominally do not effect pitch attitude. Pitch pointing commands, however, torque both wheels 24,30 in the same direction to obtain maximum control authority. The wheel sum speed is controlled to maintain a momentum-bias, which may be zero for particular missions or phases of missions. For design purposes, three coupled control loops should be considered: 1) wheel speed and pitch momentum management, 2) power delivery, and 3) pitch pointing control. These may be designed independently by bandwidth separation.

With continuing reference to FIG. 4, pitch pointing dynamics are controlled by differential wheel speed commands, $\Delta v_c$, as applied to wheels 24 and 30 through relatively low bandwidth compensation controller $F_{22}$ (s) 102. Power controls are applied to wheels 24 and 30 through the motor current $I_c$ and executed under higher bandwidth control $G_2$ (s) 144. For any particular application, power command feed forward may be required. Also, appropriate relative bandwidth selections will be required to meet specific performance specifications.

SCP 50 generates a pitch pointing command $\Theta_{2c}$ which is an input to summing block 100. The output of block 100 is multiplied by low bandwidth compensation controller $F_{22}$ (s) at block 102 to produce torque command $T_{2c}$. Compensation controller $F_{22}(s)$ is selected based on the control loop bandwidth and stability requirements of the particular application. The torque command $T_{2c}$ is divided by the nominal wheel inertia J and integrated at block 104 to produce $\delta v_c$, the necessary change in wheel velocity to achieve the requested pitch pointing. Summing block 106 computes the sum of $\delta v_c$, $\Delta v_c$, and negative feedback provided by $G_2(s)$ 144, where $\Delta v_c$ represents the change in wheel velocity to maintain the proper momentum bias, which may be zero. The output of summing block 106 is multiplied by a scale factor $K_w$ to convert the speed command to an appropriate current command which is supplied to summing block 110 for the first wheel and analogous summing block 112 for the second wheel.

With continuing reference to FIG. 4, summing blocks 110 and 112 sum the output of block 108 with the wheel current/torque command $I_c$ generated by spacecraft power subsystem 114. As indicated, block 110 subtracts $I_c$ from the output of block 108. The output of summing blocks 110 and 112 are then multiplied, respectively, by blocks 116 and 118 which represent the MG characteristics corresponding to the first and second wheels, respectively. More specifically, block 116 accounts for the lag in the response of the MG's to the commanded current.

The output of blocks 116 and 118 is then provided, respectively, to multipliers 120 and 122 of power inverter 124, and also to blocks 126 and 128. The output of blocks 116 and 118 is multiplied by $K_2$ and $K_1$, respectively, which represent the current/torque gains for the MG's, and summed with disturbance torques $D_2$ and $D_1$ at summing blocks 127 and 129 to produce torques $T_2$ and $T_1$, respectively. Disturbance torques $D_2$ and $D_1$ represent operational disturbances within the corresponding flywheel suspension system. The torques $T_2$ and $T_1$ are summed with disturbance torque $D_0$ at block 130, while also being integrated by integrators 132 and 134 to produce momentums $h_2$ and $h_1$. Disturbance torque $D_0$ represents disturbance torques external to the spacecraft, such as a solar disturbance torque or the like. The momentums $h_2$ and $h_1$ are divided by the corresponding energy wheel inertias $J_2$ and $J_1$ at blocks 136 and 138, respectively, to produce velocities $v_2$ and $v_1$. The velocities are then summed by block 140 before being multiplied by the higher bandwidth compensation controller $G_2(s)$ at block 144.

As also shown in FIG. 4, the output of summing block 130 is divided by the pitch inertia $I_{22}$ and integrated at block 146 to produce the angular velocity $\omega_2$, which is then integrated at block 148 to produce the pitch attitude $\Theta_2$ which is provided as negative feedback to summing block 100.

The power inverter 124 of FIG. 4 serves to convert alternating current through the motor/generator windings to direct current, $I_w$, on the spacecraft power bus when the wheels are delivering energy, and vice versa when the wheels are absorbing energy. It is modeled with multipliers 120 and 122 for respectively multiplying the output from blocks 118 and 116 by the output of blocks 152 and 154, where $K_1$ and $K_2$ are the current/torque motor gains as previously defined. The products generated by blocks 120 and 122 are multiplied by blocks 156 and 158, respectively, where $E_1$ and $E_2$ represent the efficiencies of the power conditioning circuitry. The output of blocks 156 and 158 is summed at block 160 to produce power P. Power P is divided by the bus voltage $V_B$ at block 162 to produce the bus current supplied by the wheels $I_w$. The solar array current, $I_p$, supplied to the spacecraft power subsystem 114 is determined by the solar array attitude $\Theta$, and the ephemeris. Solar array and wheel currents applied to the load impedance 176 produce wheel current command (torque command) $I_c$, which is supplied t summing blocks 110 and 112.

Figure 5:
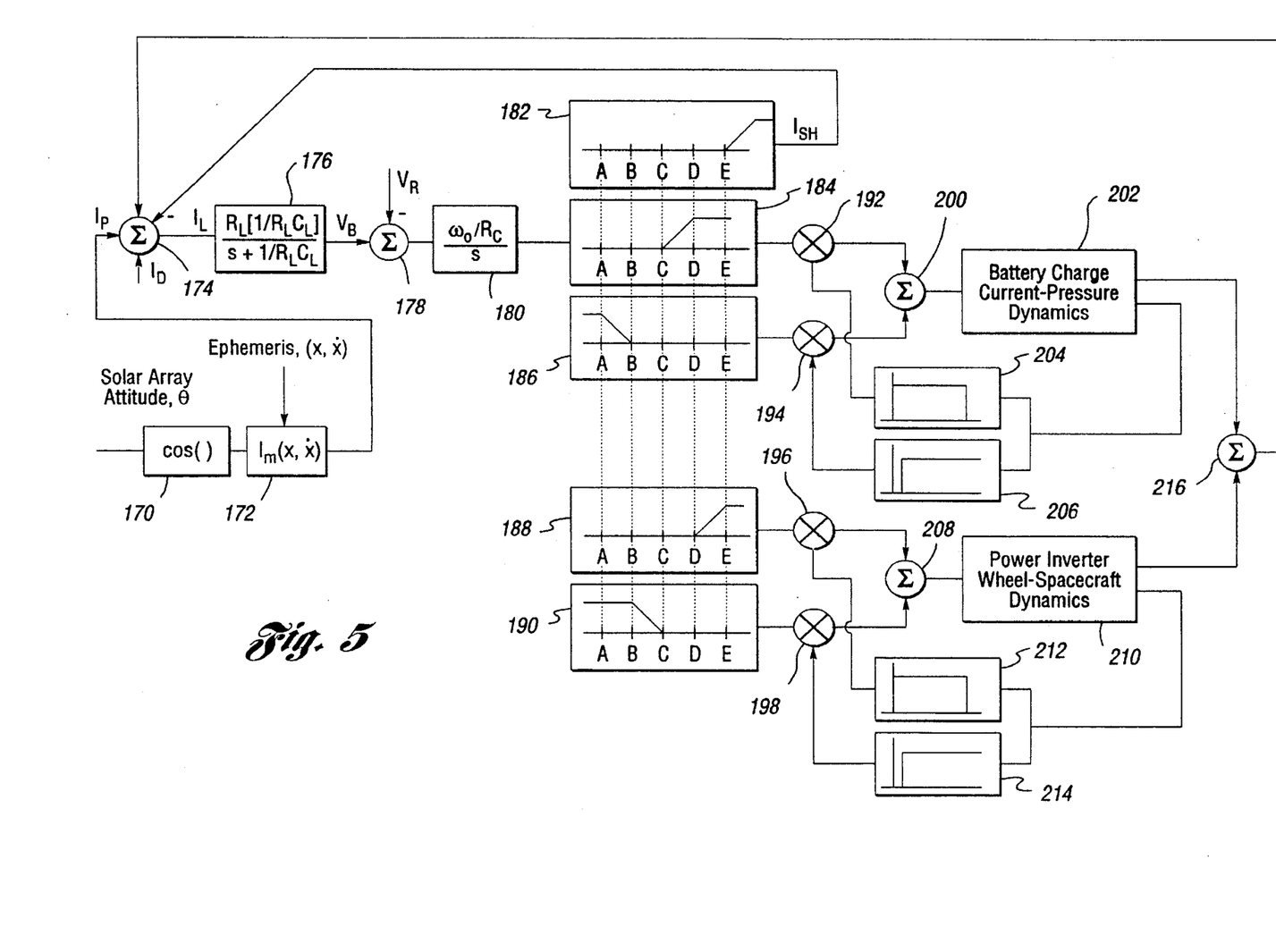
FIG. 5 illustrates a spacecraft power generation and energy storage block diagram.

The block diagram showing the spacecraft power generation and energy storage systems is shown in FIG. 5. In FIG. 5, $\Theta$ is the attitude angle which is formed between a line extending from the spacecraft to the sun, and a line normal to the solar panel. The maximum solar panel current $I_m$ will be produced when $\Theta=0°$. Thus, the current provided by solar panels 14, represented by $I_p$, is proportional to the cosine of angle $\Theta$ as represented by block 170, and the ephemeris (which determines whether the sun is visible or eclipsed) as represented by block 172. The solar panel current $I_p$ is summed by block 174 with disturbance currents $I_D$, the additive inverse of load currents $I_L$, and feedback from summing block 216, as explained below. The output of summing block 174 is multiplied by the bus load, represented by block 176 to produce the bus voltage $V_B$. Summing block 178 compares bus voltage $V_B$ with a system reference voltage $V_R$ to produce a voltage error signal which is integrated at block 180. Blocks 182 through 190 illustrate a typical power generation/energy storage cycle. Block 182 represents the bus voltage limiter. Block 184 represents an electrochemical battery charging circuitry. Block 186 represents an electrochemical battery discharging circuitry. Block 188 represents wheel charging circuitry, and block 190 represents wheel discharging circuitry.

With continuing reference to FIG. 5, for illustration purposes, assume that $V_B<V_R$ so that additional power is required other than that provided by solar panels 14. At point A, the wheel discharge block 190, and the battery discharge block 186 are active to provide additional power to maintain a substantially constant bus voltage. Between points A and B, power demand is decreasing so that block 186 decrease the power discharge from the battery (or batteries) while block 190 continues to meet the power demand by drawing down the speed of the wheels (while maintaining a substantially constant differential wheel speed). From point B to point C, power demand continues to decrease so block 190 begins to decrease the wheel deceleration to achieve substantially constant wheel speeds by point C. At point C, power supplied by solar panels 14 has exceeded the demands of the system such that $V_B>V_R$ and block 184 begins charging the battery. At point D, the battery has reached full charge so block 188 begins to charge the wheels by increasing the wheel speeds while maintaining a substantially constant differential wheel speed. At point E, the wheel speeds are approaching their velocity limit and the batteries are fully charged so that bus voltage limiter block 182 begins to dissipate excess energy.

Various relative settings of the limits B, C, and D of FIG. 5 may be selected to choose either the flywheel or the battery as first and second level energy sources, or in a particular spacecraft either may be absent. The preferred embodiment of the present invention does not utilize a chemical battery. However, a chemical battery is included in the illustration and description for generality.

Multiplier blocks 192 and 194 act as a switch to either block or pass control signals from blocks 184 and 186. Blocks 204 and 206 provide the multiplier to blocks 192 and 194, respectively. The multiplier assumes a value of either zero or unity as determined by the battery charge current/pressure dynamics model 202 to either block or pass the control signals, respectively. For example, while the battery is being charged between points C and D, model 202 signals block 204 to generate a unity multiplier. As the battery charges, its internal pressure increases until it triggers block 204 to produce a zero multiplier to block 192 so the negative input to summing block 200 also has a zero value. Block 206 produces a similar multiplier having a value of either zero or unity to control the discharging of the battery. The output of block 202 is also summed with the output of power inverter wheel/spacecraft dynamics block 210 at summing block 216.

In a similar fashion, multiplier blocks 196 and 198 multiply control values generated by blocks 212 and 214 which assume a value of either zero and unity to control wheel charging and discharging. The outputs of blocks 196 and 198 are combined by summing block 208 to produce wheel current/torque command $I_c$ which serves as an input to block 210. The dynamics represented by block 210 were illustrated in FIG. 4 and described in greater detail above.

Figure 6:
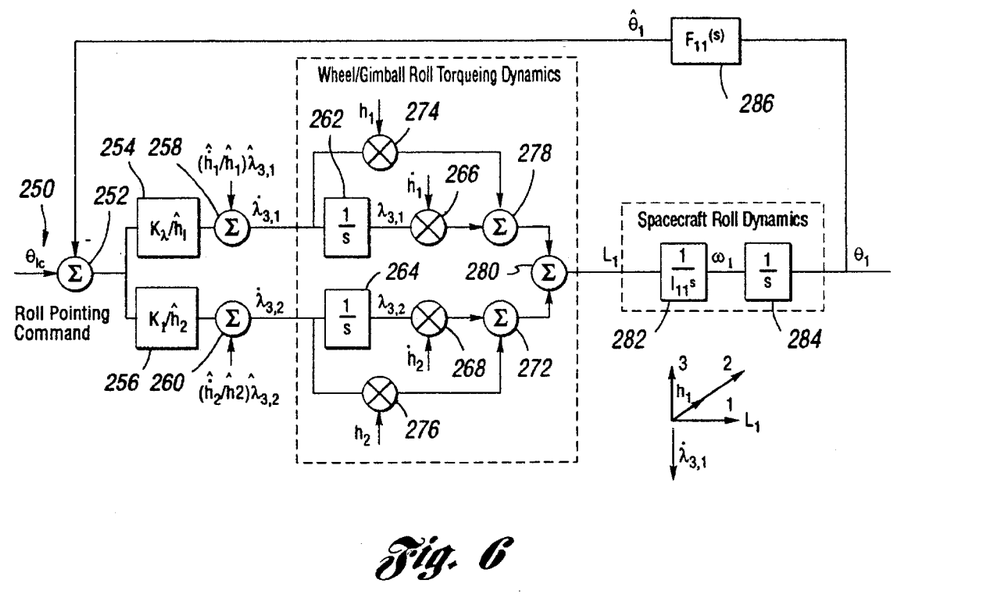
FIGS. 6 and 7 illustrate spacecraft roll pointing and yaw pointing dynamics, respectively, in accordance with the present invention.
Figure 7:
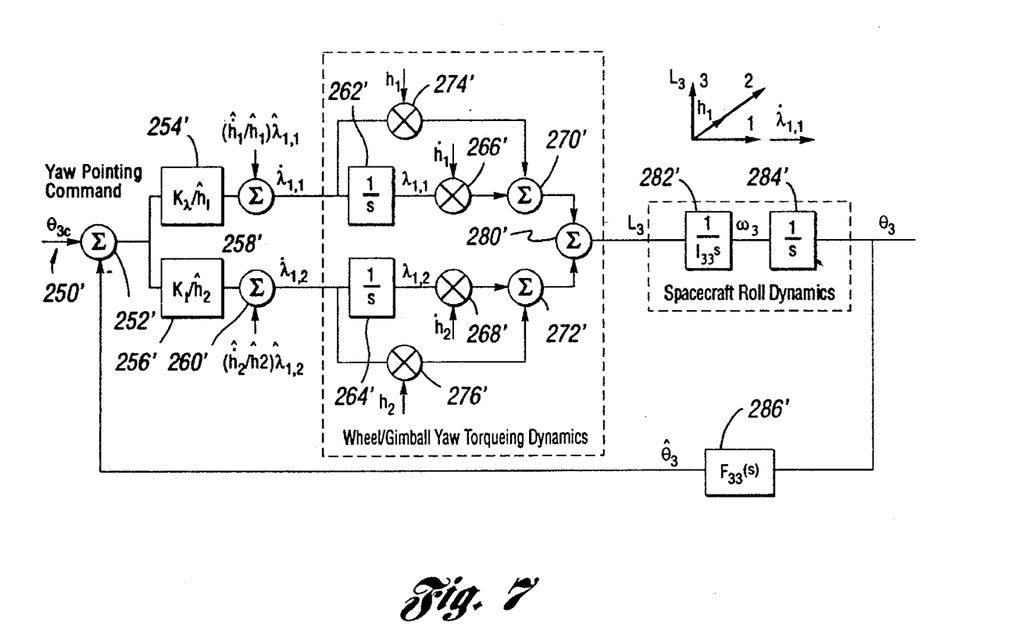

Referring now to FIG. 6, the spacecraft roll pointing dynamics are illustrated in accordance with the present invention. FIG. 7 illustrates the spacecraft yaw pointing dynamics which respond in a similar fashion as the roll pointing dynamics illustrated in FIG. 6. Therefore, the following discussion refers only to FIG. 6 with the primed reference numerals in FIG. 7 having an analogous function to the corresponding unprized reference numerals of FIG. 6. A pointing command $\Theta_{1c}$, indicated by reference numeral 250 is generated by SCP 50 and input to error generator block 252 which also receives negative feedback from control loop compensation block 286. The output of block 252 is provided to block 254 which corresponds to the first wheel, and to block 256 which corresponds to the second wheel. Blocks 252 and 254 multiply their inputs by a constant scaling factor and the result is provided to summing blocks 258 and 260, respectively. Summing blocks 258 and 260 add the product of the estimated rate of momentum change $\hat{h}_1$ divided by the estimated wheel momentum $\hat{h}_1$ multiplied by the estimated angle of wheel tilt $\hat{\lambda}_{3,1}$ to produce the rate of wheel tilt $\dot{\lambda}_{3,1}$ for each wheel.

With continuing reference to FIGS. 6 and 7, The rate of wheel tilt is integrated by blocks 262 and 264 to produce the tilt angle for each wheel $\lambda_{3,1}$. Blocks 266 and 268 multiply the output of integrators 262 and 264 (wheel tilt angles), respectively, by the rate of change in momentum due to wheel torque $\dot{h}_1$ (produced by the power generation/energy storage and pitch control dynamics). The output of blocks 266 and 268 is then provided as an unavoidable disturbance torque to summing blocks 270 and 272, respectively. Blocks 274 and 276 multiply the rate of wheel tilt $\dot{\lambda}_{3,1}$ and $\dot{\lambda}_{3,2}$ by the corresponding wheel momentum to provide the desired control torque so as to cancel the unwanted torque produced. The result is then fed forward to summing blocks 270 and 272, respectively. The output of blocks 270 and 272 is combined by summing block 280 to produce a pointing control torque $L_1$. The pointing torque is divided by the roll inertia $I_{11}$ and integrated by block 282. The result is then integrated again by block 284 to produce the roll pointing angle $\Theta_1$.

One significant aspect of the present invention is the versatility of the energy storage/attitude control realization achieved. The invention permits one design concept in hardware implementation to serve for a variety of spacecraft steering laws and orbit parameters. In this regard, examples include geosynchronous communications or sun synchronous Earth observation orbits that often employ momentum bias normal to the orbit plane and simple nadir pointed steering, to an inclined elliptical orbit, for example for a navigation mission, which employs a more complex sun-nadir steering and requires zero momentum.

Although particular embodiments of the present invention have been illustrated in the accompanying drawings and described in the foregoing detailed description, it is to be understood that the present invention is not to be limited only to the embodiments disclosed, but that they are capable of numerous rearrangements, modifications and substitutions without departing from the scope of the claims hereafter.

What is claimed is:

1. An energy storage and retrieval system for a spacecraft having a body and a pitch axis, the system comprising:
    a first flywheel disposed within the body and reversibly rotatable about a first spin axis substantially co-aligned with the pitch axis, wherein rotation of said first flywheel produces a first momentum directed along the first spin axis;
    a second flywheel disposed within the body and reversibly rotatable about a second spin axis substantially co-aligned with the pitch axis, wherein rotation of said second flywheel produces a second momentum directed along the second spin axis so as to produce a non-zero net momentum; and
    a processor in communication with the first and second flywheels for controlling alignment of the first and second spin axes, direction of rotation of said first and second flywheels, and a rotational speed of said first and second flywheels so as to increase the rotational speed of at least one of said first and second flywheels to store energy, said processor also operative to decrease the rotational speed of at least one of said first and second flywheels to retrieve energy.

2. The system of claim 1 wherein each of said first and second flywheels is gimbaled about two non-collinear axes orthogonal to its corresponding spin axis.

3. The system of claim 1 wherein at least one of said first and second flywheels includes a gimbal tilt controlled by a plurality of jackscrews.

4. The system of claim 3 wherein the plurality of jackscrews are reversibly selectively rotated by a corresponding plurality of stepper motors in communication with said processor.

5. The system of claim 1 wherein the spacecraft further includes a roll axis and a yaw axis and wherein said first and second flywheels are operative to steer roll, pitch, and yaw.

6. The system of claim 1 wherein the spacecraft travels in a plurality of different orbits.

7. The system of claim 1 wherein the spacecraft is utilized for a plurality of different missions.

8. The system of claim 1 wherein said first and second flywheels are mounted within the body on two- degree-of-freedom flexible pivots.

9. The system of claim 1 further comprising first and second non-contacting magnetic bearing sets for suspending said first and second flywheels, respectively, within the body.

10. A control system for a spacecraft including energy control, attitude steering, and momentum management functions, the system comprising:
    a body having three mutually orthogonal axes including a pitch axis, a roll axis, and a yaw axis;
    a first gimbaled flywheel disposed within the body and reversibly rotatable about a first spin axis substantially co-aligned with the pitch axis, wherein rotation of said first gimbaled flywheel produces a first momentum directed along the first spin axis;
    a second gimbaled flywheel disposed within the body and reversibly rotatable about a second spin axis substantially co-aligned with the pitch axis, wherein rotation of said second gimbaled flywheel produces a second momentum directed along the second spin axis; and a processor in communication with said first and second gimbaled flywheels for controlling alignment of the first and second spin axes to effect attitude steering, direction of rotation of said first and second gimbaled flywheels to effect momentum management, and a rotation velocity of said first and second gimbaled flywheels to effect energy control, said processor being operative to increase the velocity of at least one of said first and second gimbaled flywheels to store energy and to decrease the velocity of at least one of said first and second gimbaled flywheels to retrieve energy.

11. The system of claim 10 wherein said processor controls the direction of rotation of said first and second gimbaled flywheels such that said first and second momentums act in a substantially similar direction.

12. The system of claim 10 further comprising at least one electrochemical battery in communication with said processor for storing energy when the rotational speed of at least one of said first and second gimbaled flywheels is greater than a first predetermined speed and for providing energy when the rotational speed of at least one of said first and second gimbaled flywheels is less than a second predetermined speed.

13. A method for providing energy storage and retrieval in a spacecraft having a body, a pitch axis, a first gimbaled flywheel disposed within the body and reversibly rotatable about a first spin axis substantially co-aligned with the pitch axis, wherein rotation of said first gimbaled flywheel produces a first momentum directed along the first spin axis, a second gimbaled flywheel disposed within the body and reversibly rotatable about a second spin axis substantially co-aligned with the pitch axis, wherein rotation of said second gimbaled flywheel produces a second momentum directed along the second spin axis so as to produce a non-zero net momentum, and a processor in communication with the first and second gimbaled flywheels via a power bus, the processor operative to control orientation of the first and second spin axes, a direction of rotation of said first and second gimbaled flywheels, and a rotational speed of said first and second gimbaled flywheels, the method comprising:

increasing the rotational speed of said first and second gimbaled flywheels while maintaining a predetermined differential rotational speed between said first and second gimbaled flywheels to store energy when a voltage associated with the power bus is greater than a predetermined reference voltage; and decreasing the rotational speed of said first and second gimbaled flywheels while maintaining a predetermined differential rotational speed between said first and second gimbaled flywheels to retrieve energy when a voltage associated with the power bus is less than a predetermined reference voltage.

\* \* \* \* \*